(12) United States Patent
Ingle

(10) Patent No.: US 9,810,193 B2
(45) Date of Patent: Nov. 7, 2017

(54) CONVERTIBLE WATER PUMP

(71) Applicant: Michael Ingle, Vallejo, CA (US)

(72) Inventor: Michael Ingle, Vallejo, CA (US)

(*) Notice: Subject to any disclaimer, the term of this patent is extended or adjusted under 35 U.S.C. 154(b) by 324 days.

(21) Appl. No.: 14/742,619

(22) Filed: Jun. 17, 2015

(65) Prior Publication Data

US 2015/0361947 A1 Dec. 17, 2015

Related U.S. Application Data

(60) Provisional application No. 62/013,352, filed on Jun. 17, 2014.

(51) Int. Cl.
| | | |
|---|---|---|
| *F03B 7/00* | (2006.01) | |
| *F03B 11/02* | (2006.01) | |
| *F03B 13/00* | (2006.01) | |
| *F03B 13/18* | (2006.01) | |

(52) U.S. Cl.
CPC ............ *F03B 7/00* (2013.01); *F03B 11/02* (2013.01); *F03B 13/00* (2013.01); *F03B 13/188* (2013.01); *F05B 2260/02* (2013.01); *Y02E 10/223* (2013.01); *Y02E 10/226* (2013.01)

(58) Field of Classification Search
CPC .. F03B 7/00; F03B 11/02; F03B 13/00; F03B 11/188; F05B 2260/02; Y02E 10/223; Y02E 10/226
See application file for complete search history.

(56) References Cited

U.S. PATENT DOCUMENTS

| | | | | |
|---|---|---|---|---|
| 3,335,667 A | * | 8/1967 | Murphy | F03B 13/188 405/76 |
| 4,163,633 A | * | 8/1979 | Vriend | F03B 13/1815 417/332 |
| 4,672,222 A | * | 6/1987 | Ames | F03B 13/1895 290/53 |
| 5,808,368 A | * | 9/1998 | Brown | F03B 13/1815 290/42 |
| 7,823,380 B2 | * | 11/2010 | Ghouse | F03B 13/147 60/496 |
| 8,429,910 B2 | * | 4/2013 | Ghouse | F03B 13/1815 417/100 |
| 8,432,057 B2 | * | 4/2013 | Filardo | F03B 13/188 290/54 |
| 8,633,608 B2 | * | 1/2014 | Grey | F03B 13/148 290/42 |
| 8,836,153 B2 | * | 9/2014 | Ehrnberg | F03B 13/188 290/42 |

* cited by examiner

*Primary Examiner* — Igor Kershteyn
(74) *Attorney, Agent, or Firm* — Donn K. Harms

(57) ABSTRACT

A convertible pump formed of wound flexible tubing having an inlet communicating water to an outlet at an opposite end of the tubing. A paddle wheel with collapsible fins provides power to rotate the pump when in a vertical position. A planar surface of the wound tubing forms a table when pivoted on a stand to a horizontal disposition with the support surface for the stand.

8 Claims, 5 Drawing Sheets

CONVERTIBLE WATER PUMP

This application claims priority to U.S. Provisional Patent Application Ser. No. 62/013,352 filed on Jun. 17, 2014 which is incorporated herein in its entirety by this reference thereto.

BACKGROUND OF THE INVENTION

1. Field of the Invention

The invention herein disclosed relates generally to water pumps. More particularly, it relates to a Wirtz style, or spiral water pump which is configured to provide pressurized water, or rotational force to drive a generator in a vertical disposition, or be employed as a table in a horizontal disposition relative to the support surface for a stand holding it.

2. Prior Art

Wirtz style pumps, or spiral pumps, are well known in the art. A Wirtz, or spiral pump, is a pump which is conventionally configured using a wound tube on a reel, which forms a circular disc. In operation of a conventional Wirtz pump, a scoop at an entry point to the wound tube, when submerged in a water source, communicates water from that water source, such as a stream, into the circular conduit provided by flexible circular-wound tubing. The water so communicated into the flexible circular-wound tubing flows through the axial passage of the tubing to the opposite end of the passage where it discharges under pressure. This communicated pressurized discharge of water may be employed by the user for conventional watering, washing or other purposes, or it may be employed to drive machinery such as a generator which is connected using a power shaft extending from the axle of the stand supporting the circular-wound tubing and paddle wheel.

The circular-wound tubing forming the planar disc of a conventional Wirtz pump is operationally engaged on an axle. Positioned thereon, the wound tubing is driven by paddles engaged thereto, which are moved by the force of the water from a stream, or other moving water source.

This circular substantially planar disc formed by the wound tubing may be rotationally engaged either horizontally or vertically oriented in use. Conventionally, paddles providing rotational force to the disk formed by the wound tubing or on which the wound tubing is engaged, may be located in a plurality of locations, including beyond the circumference of the circular disc or to the side of the formed circular disc.

The Wirtz pump in modern times has lost some desirability in some applications where electricity is present. However, the Wirtz pump still has great desirability in areas where electricity may not be present, such as during hiking, camping, mining, and remote agriculture, for example.

However, in these applications, particularly where weight and space is at a premium, such as when hiking with a backpack, for example, the Wirtz pump occupies a considerable amount of the valuable space of the hiker. Consequently, to justify transport to such locations, a Wirtz type pump would need to provide additional functions for the user in order to justify the space and weight penalties imposed by the Wirtz pump during transport.

Such additional functions should provide the user with useful utility in the venue or location wherein the Wirtz style pump is being transported. Further, in order to minimize the space required for such transport, the actual size of the Wirtz style pump, should be able to be compacted during storage and enlarged for use.

With respect to the above, before explaining at least one preferred embodiment of the convertible Wirtz pump disclosed herein, it is to be understood that the invention is not limited in its application to the details of construction and to the arrangement of the pump, or other configurations set forth in the following description or illustrated in the drawings.

The various apparatus and methods of the disclosed pump configurations of the invention are capable of other embodiments, and of being practiced and carried out in various ways, all of which will be obvious to those skilled in the art, once the information herein is reviewed. Also, it is to be understood that the phraseology and terminology employed herein are for the purpose of description and should not be regarded as limiting.

As such, those skilled in the art will appreciate that the conception upon which this disclosure is based may readily be utilized as a basis for configuring other modes of the pump, and for carrying out the several purposes of the present disclosed device and method. It is important, therefore, that the embodiments, objects and claims herein, be regarded as including such equivalent construction and methodology insofar as they do not depart from the spirit and scope of the present invention.

SUMMARY OF THE INVENTION

The disclosed device and method provides a solution to the above noted shortcomings of a conventional Wirtz pump which as noted has limited configurations and occupies too much space when stored. The device and method herein provides a novel system and operational mount, as well as unique collapsible fins, which render the Wirtz pump multi functional as well as smaller during storage and transport. In addition to communicating pressurized water from a moving water source, for general use, the device herein is also configured to power a generator, and to provide an elevated table or working surface, by employing a power shaft in an engagement to the generator.

In a preferred mode of the device, the convertible Wirtz pump configuration of the device herein, includes a scoop engaged to the distal end of a length of flexible circular-wound tubing. At the opposite end of the tubing is located a water discharge which is engageable to a hose to provide water for normal use. Alternatively a power shaft may be engaged, or may also be a rigid water discharge conduit, and may be engaged to drive a generator.

Particularly preferred are the inclusion of foldable paddles which are engaged to the circular-wound tubing or the mount therefor, to rotate the Wirtz pump. The paddles or fins are in a rotational engagement with the base of the paddle wheel, which once operatively engaged with the circular-wound tubing and an a stand-engaged axle, will rotate the circular wound tubing in the moving water of a stream or river. Preferably the stand has a swivel at the engagement with the spiral wound tubing and paddle, to allow positioning of a supported Wirtz pump in both a vertical pumping position, or a horizontal position where the circular wound tubing can function as a table.

In a particularly useful mode of the device, the Wirtz pump engaged with the stand provided herein, is positionable to both horizontal and vertical orientations during operation. When positioned to the horizontal orientation, the Wirtz pump engaged to the stand herein may be employed to function as a table or elevated working surface.

In a further preferred mode of the device, the Wirtz pump may be employed to drive a shaft or power take-off unit which is removably engageable to communicate power from the reel of the wound tubing. The power take-off unit includes a power take-off shaft, which may be threadably or otherwise engaged between the powered reel of wound tubing, and a generator or pump to irrigate a garden.

It is an object of this invention to provide a support for a Wirtz style pump device, allowing it to function in a horizontal orientation as a table or working surface or a vertical disposition.

It is a further object of this invention to provide an improved mode of a Wirtz style pump which includes a mechanical power shaft that is engageable between a generator and the device to generate electricity or to provide irrigation.

These together with other objects and advantages which become subsequently apparent reside in the details of the convertible Wirtz pump device as more fully hereinafter described and claimed, reference being had to the accompanying drawings forming a part thereof, wherein like numerals refer to like parts throughout.

BRIEF DESCRIPTION OF DRAWING FIGURES

DETAILED DESCRIPTION OF THE PREFERRED EMBODIMENTS OF THE INVENTION

Figure 1:
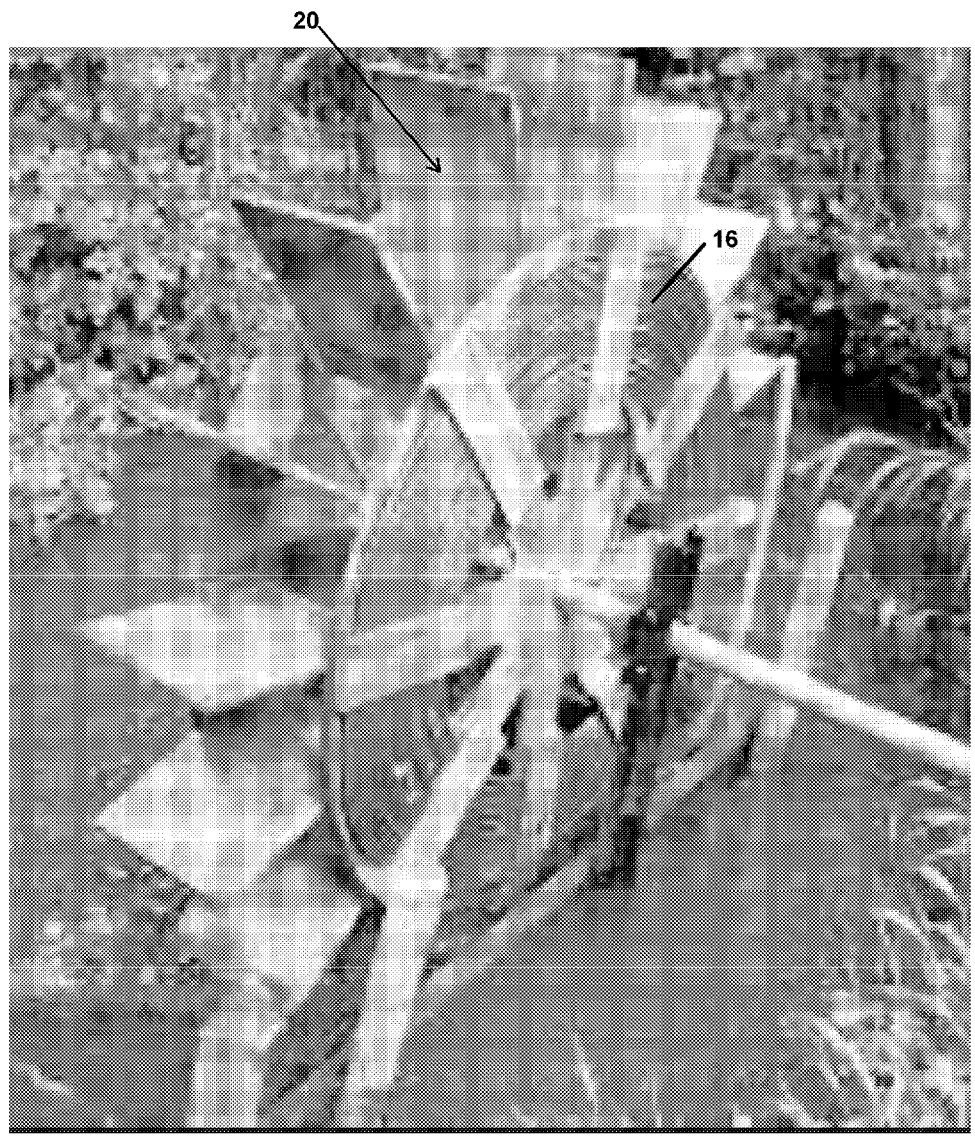
FIG. 1 depicts a perspective view of a prior art Wirtz style pump which are engaged to rotate the reel of tubing to provide rotation and pump water therethrough.
Figure 2:
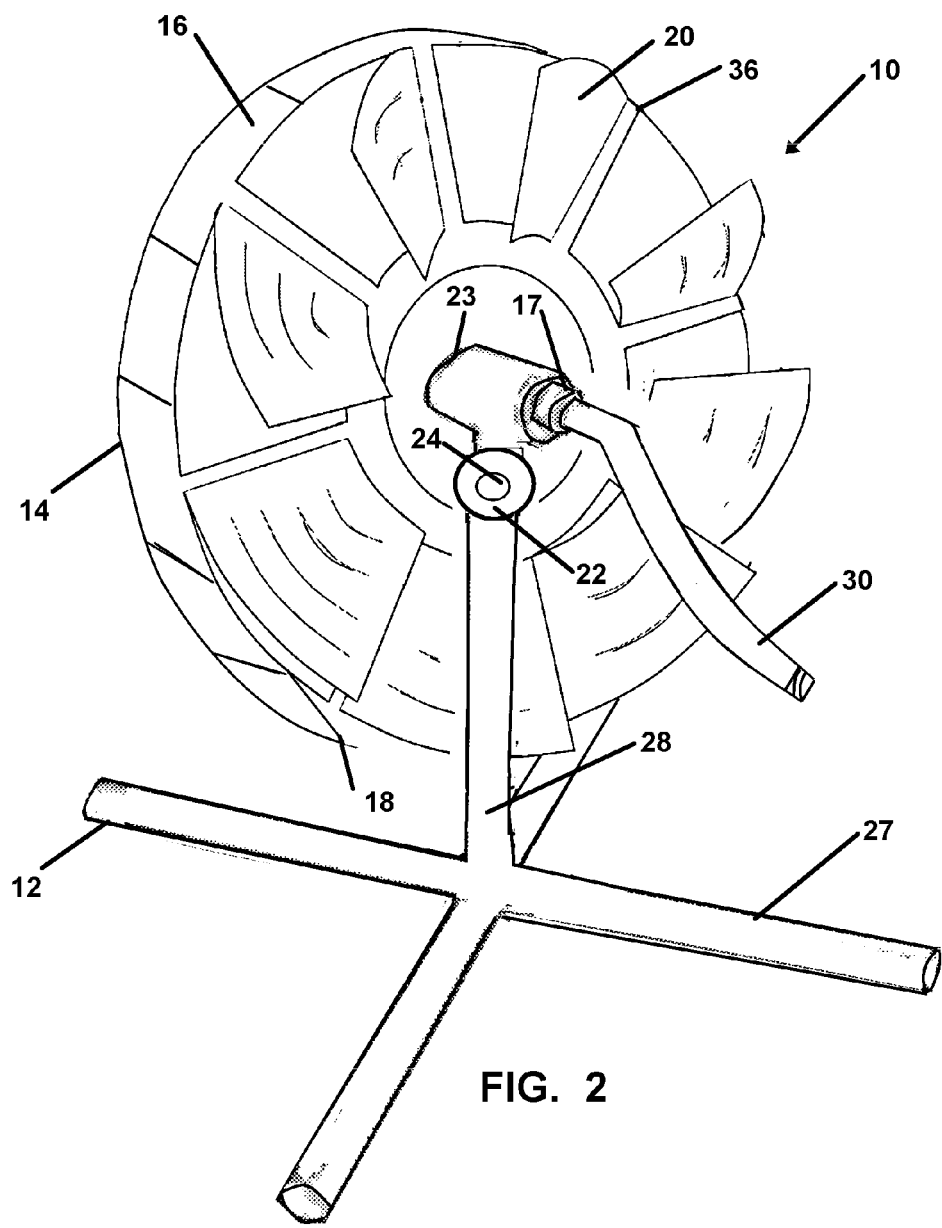
FIG. 2 depicts a perspective view of a mode of the pump device herein oriented on the stand with the locking swivel moved to place the wound tubing and paddle in a vertical position with a hose attached a water discharge.
Figure 3:
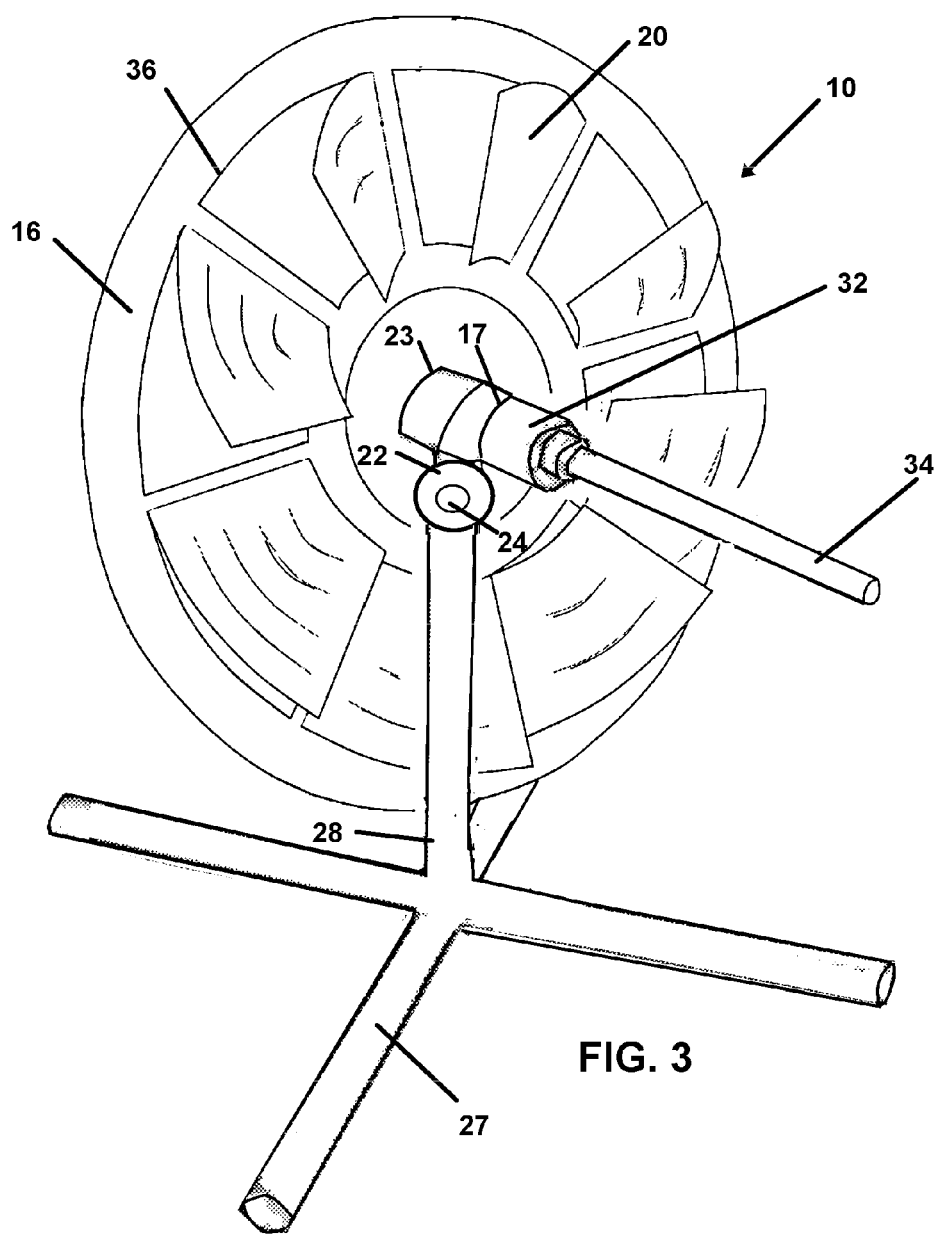
FIG. 3 depicts a perspective view of a mode of the pump device oriented on a stand in the vertical position with a power take-off shaft attached to rotate using the power of the rotating wheel.
Figure 4:
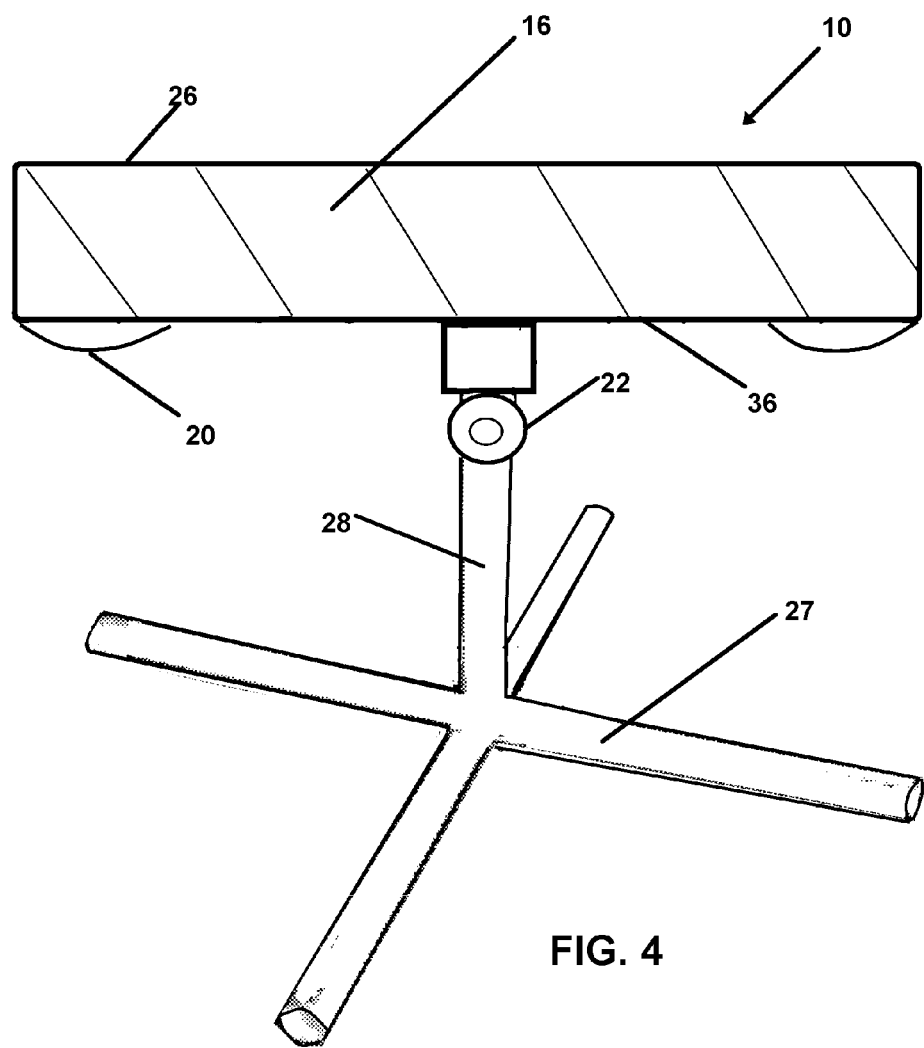
FIG. 4 is a representative depiction of the device herein where the planar member formed by the wound tubing has been pivoted in the engagement with the stand, and fixed to be oriented in a horizontal position for use as a table.

Referring now to the FIGS. 1-5, where similar components are designated by like numerals, the convertible pump device 10, which when employed engaged with the novel stand 12 herein, will not only function to pump water from a moving source, such as a river or stream in a conventional employment of a Wirtz pump to pump water as in FIG. 2, but is also configurable to provide mechanical power as in FIG. 3, or a table as in FIG. 4.

As noted above, the device employs a Wirtz pump which is well known in the art and an exemplar of such is shown in FIG. 1. The pump 14 employs a wound tube or conduit 16 which has a scoop 18 or similar component to force water into the conduit 16 as the pump 14 is rotated on an axle by paddles 20.

The pump 14 so configured herein, is operative engaged to the stand 12, preferably using a swivel 22 to support the axle 23 of the pump 14 to the stand 22. The swivel 22 may be any swivel 22 which will support the weight of the pump 14 on the stand 12. Preferably the swivel 22 may be locked into position using a disengageable lock 22 which are well known in the art to lock a swivel 22 or pivot in position once reached.

The device 10 herein, has an operating position for the pump 14 wherein it is moved to a vertical position where the axis of the wound tubing 16 is normal or perpendicular to the support surface such as in FIGS. 2 and 3. The device 10 also has a support position, shown in FIG. 4, wherein the wound tubing 16 provides a planar surface 26 which is positioned perpendicular to the upright member 28 of the stand 12. The releasable locking pivot or swivel 22 allows the pump 14 to be rotated to place a side surface of the wound tubing 16 to provide this planar surface 26 for use as a table or the like.

The device 10, using the unique engagement of the pump 14 to the stand 12, shown in FIG. 2, may thus be used for providing water to a hiker with a backpack or an RV camper, or a gardener or farmer irrigating crops in a remote location without access to electricity.

In a preferred mode of the device 10 herein, the Wirtz pump 14 is supported by the stand 12 which includes horizontal legs 27 and the upright member or vertical riser 28 as shown in FIGS. 2-4. At the distal end of the vertical member forming the vertical riser 28, is positioned a pivot or rotational component such as the swivel 22. As noted it is this swivel 22 which is preferably removably locked, to hold the wound tubing 16 in a vertical and horizontal orientation, to allow for multiple uses of the device 10.

Oriented in an engagement to the stand 12 to a vertical positioning, as in FIGS. 2, the device 10 includes a hose 30 in sealed communication with to opposite end of the wound tubing 16 from the scoop 18. The hose 30 when engaged, with the pump 14 operatively positioned in a stream or river, may be utilized for a communicating pressurized water to a shower, or to facilitate storing water in containers or a reservoir.

In another mode of the device 10 herein, the pump 14 may be positioned vertically on the stand 12 for operation to pump water under pressure. The pressurized water may be communicated to fluid driven drive or power take-off unit 32 in FIG. 3, which is engaged to rotate shaft 34. The shaft 34 can be engaged to a generator, or pump, or other device requiring mechanical power.

In all modes of the device 10 herein, it is preferred that an engageable paddle wheel 36, has a plurality paddles 20 which are positionable from a projecting position to collapsed position because collapsing the paddles to a collapsed position with the distal ends of paddles 20 adjacent the base 38 of the paddle wheel 36, significantly reduce the volume of the pump 14 for storage and transport. Such is graphically depicted in FIG. 4 where two fins 20 are shown moved to the collapsed position.

Further, it is preferably that the paddle wheel 36 be removably engageable to a side surface of the wound tubing 16, or a mount for the wound tubing 16 to power the rotation thereof when the device 10 is supported on the stand 12 in the vertical disposition to rotate with the paddles 20 when in contact with moving water. The paddles 20 being foldable to a compact configuration, facilitate transportation of the pump 14 by a backpack.

Figure 5:
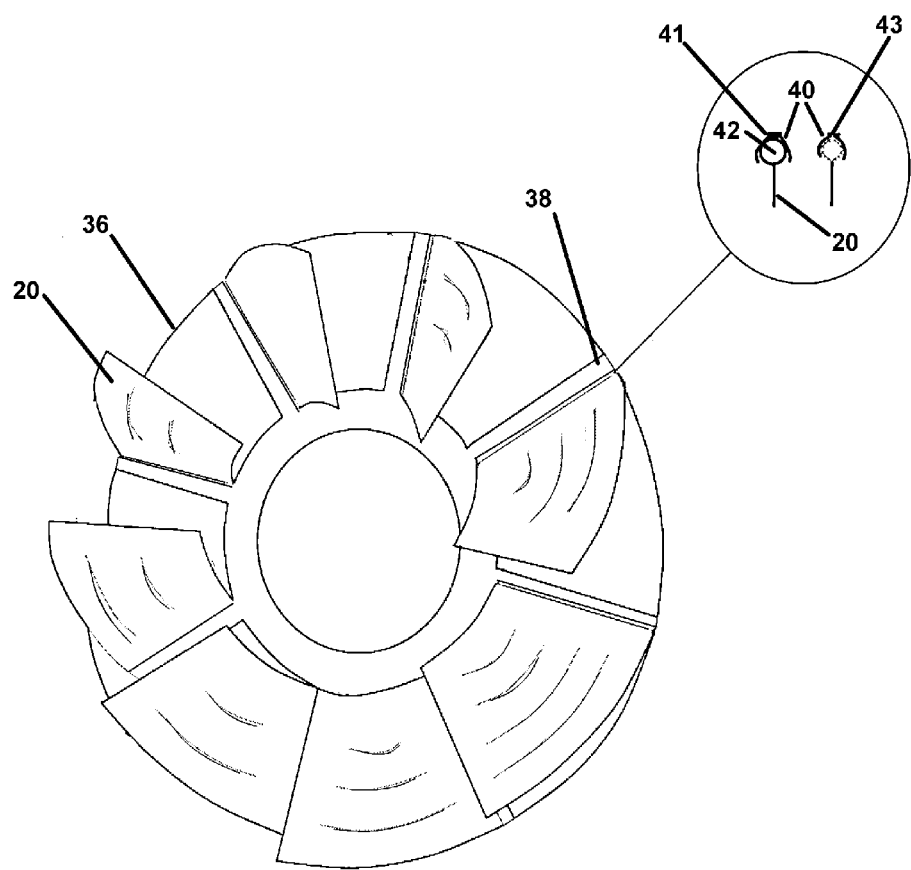
FIG. 5 depicts a perspective view of the paddle wheel showing the preferably swivel engagement to render the paddles collapsible to reduce the size of the device for storage.

As shown in the enlargement area of FIG. 5, the base end of each paddle 20 is engaged to rotate away from a compacted position with the distal end adjacent the base 38 of the paddle wheel 36, to a deployed position where the distal end of the paddles 20 are distanced away from the base 38 as in figures. The paddles 20 should be rotationally engaged such that they remain in the position set by the user, until repositioned. Such can be by frictional engagement 41 of a cupped mount 40 with a ball 42 engaged with the paddle 20, or as also shown, a ratcheted engagement 43 between cupped mount 30 and a ball 42, or other engagements as would occur to those skilled in the art.

As noted above, in a particularly preferred mode of the device 10, the stand 12 is engaged with the wound tubing 16 or a mount therefor, such that the wound tubing 16 may pivot to a horizontal position as in FIG. 4. It thus allows the device 10 to convert to provide a table or work surface. This pivoting on the stand 12 to the table configuration is facilitated by folding-down the paddles 20 to a collapsed configuration noted above. Also collapsing the paddles 20, from the projecting position as in FIGS. 2 and 3, to the collapsed position of FIG. 4, allows more leg room when the device is used as a table.

In a mode of operation of the device 10 herein, it may also be configured as a generator which would charge a battery. In this mode of the device 10 the generator is preferably a 12-volt DC generator capable of charging cell phones and laptops. In operation, the generator is configured to engage with the power take-off shaft 34 in FIG. 3, which is engageable by engaging the power take off 32 to the water discharge 17 for the hose 13 shown in FIG. 2, and connecting the shaft 34 to the take off 32. Water will drive the fluid driven power take off 32 to rotate the shaft 34.

In another mode of operation of the device 10 herein, it may be configured to provide irrigation to a garden. The hose 13 may connect the water discharge 17 operationally engaged with tubing 16, and communicate water during operation of the device 10 as a pump, to irrigation equipment.

While all of the fundamental characteristics and features of the disclosed device herein, and employment thereof have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the disclosed system and apparatus for a convertible Wirtz pump, as defined by the following claims.

What is claimed is:

1. A pump device comprising:
a Wirtz pump including a scoop, flexible tubing wound in a circular configuration;
said wound tubing in said circular configuration, said wound tubing having an inlet end communicating through an axial passage with an outlet;
said wound tubing having a first planar surface and second planar surface;
a paddle wheel operatively engaged to said wound tubing adjacent said first planar surface;
said paddle wheel having a base and a plurality of paddles each of said paddles having a proximal end and a distal end;
each of said paddles in a pivoting engagement with said base, at a respective proximal end thereof;
said paddles pivotable from a collapsed position with said distal ends thereof adjacent said base, to a projecting position with said distal ends distanced from said base by a length of said paddles running between said proximal end and said distal end; and
a stand having a vertical member for supporting said wound tubing and said paddle engaged therewith, in an elevated position above a support surface.

2. The pump device of claim 1 additionally comprising:
a pivoting engagement between said vertical member and an axle rotationally engaging said wound tubing; and
said pivoting engagement rendering said wound tubing positionable between a vertical disposition with said first planar surface vertically disposed relative to said support surface, and a horizontal disposition running horizontal to said support surface, whereby said second planar surface of said wound tubing forms a table with said wound tubing in said horizontal disposition.

3. The pump device of claim 1 additionally comprising:
a hose engage in a sealed engagement with said outlet.

4. The pump device of claim 2 additionally comprising:
a hose engage in a sealed engagement with said outlet.

5. The pump device of claim 1 additionally comprising:
a fluid driven power take off unit engageable in a sealed engagement with said outlet; and
a shaft engaged with said power take off unit, whereby water under pressure from said outlet rotates said power take off unit to rotate said shaft.

6. The pump device of claim 2 additionally comprising:
a fluid driven power take off unit engageable in a sealed engagement with said outlet; and
a shaft engaged with said power take off unit, whereby water under pressure from said outlet rotates said power take off unit to rotate said shaft.

7. The pump device of claim 3 additionally comprising:
a fluid driven power take off unit engageable in a sealed engagement with said outlet; and
a shaft engaged with said power take off unit, whereby water under pressure from said outlet rotates said power take off unit to rotate said shaft.

8. The pump device of claim 4 additionally comprising:
a fluid driven power take off unit engageable in a sealed engagement with said outlet; and
a shaft engaged with said power take off unit, whereby water under pressure from said outlet rotates said power take off unit to rotate said shaft.

* * * * *